Dec. 16, 1941.  M. RICHTER  2,266,513
METHOD AND MEANS FOR PRODUCING KNITTED FABRICS
Filed Dec. 17, 1937  12 Sheets-Sheet 1
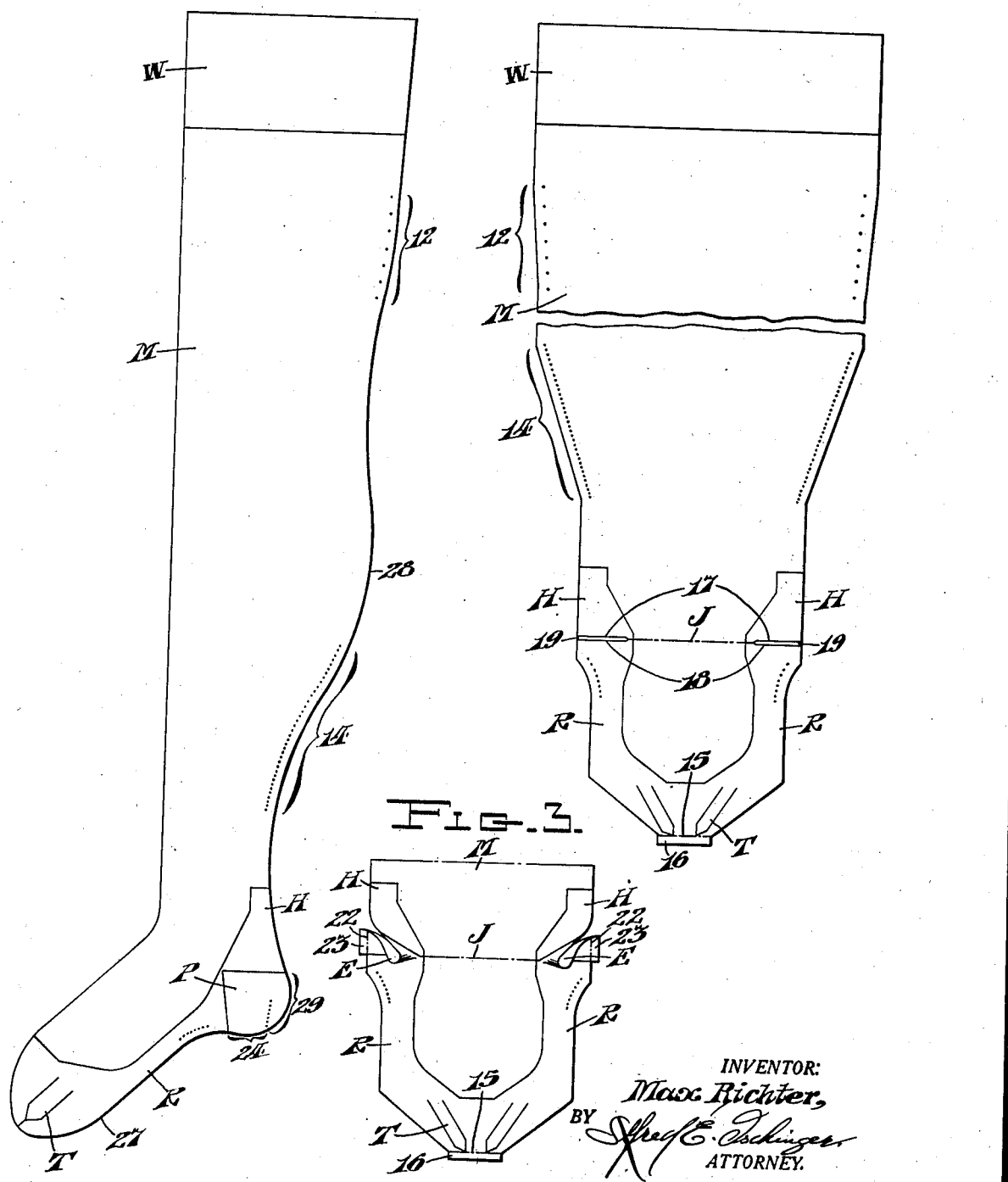

Dec. 16, 1941. M. RICHTER 2,266,513
METHOD AND MEANS FOR PRODUCING KNITTED FABRICS
Filed Dec. 17, 1937 12 Sheets-Sheet 2
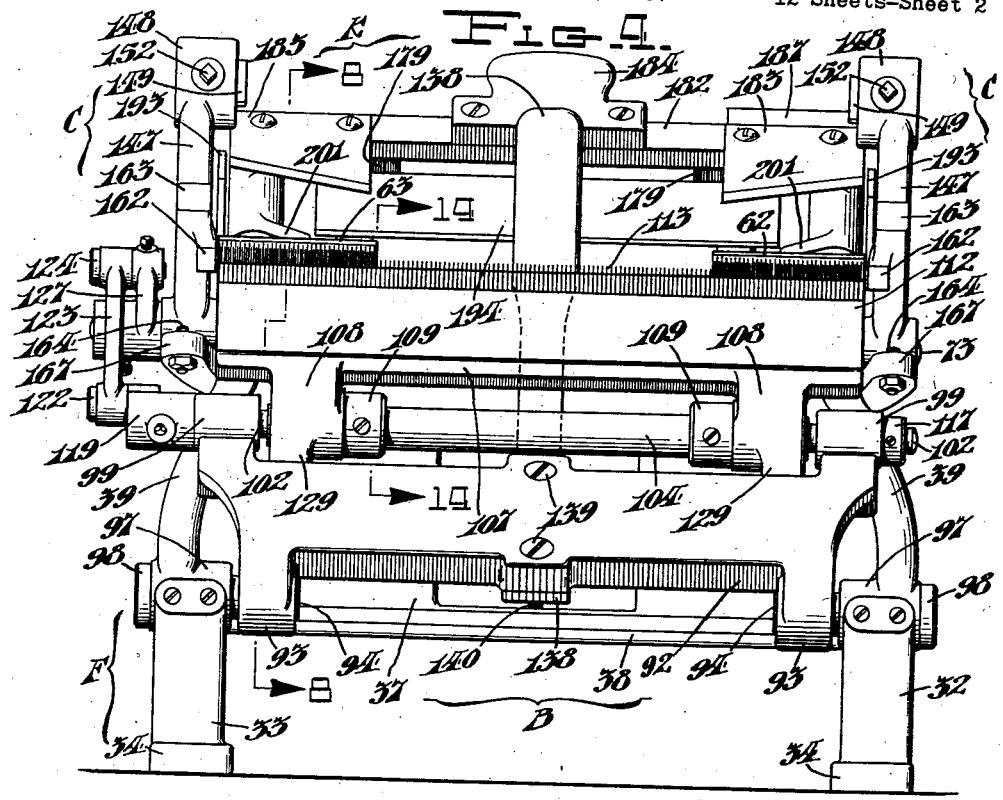
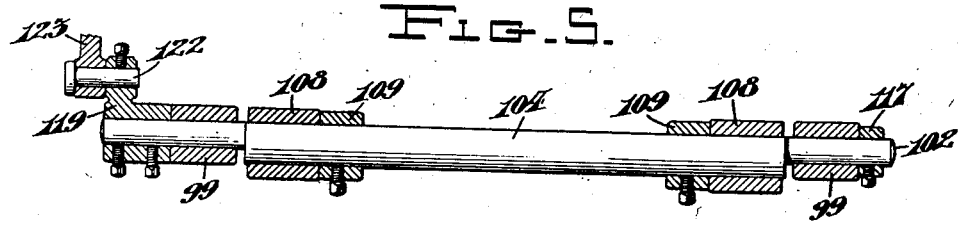
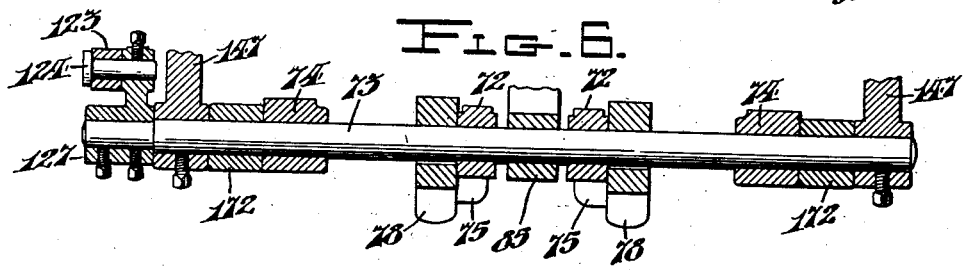
INVENTOR:
Max Richter,
BY
ATTORNEY.

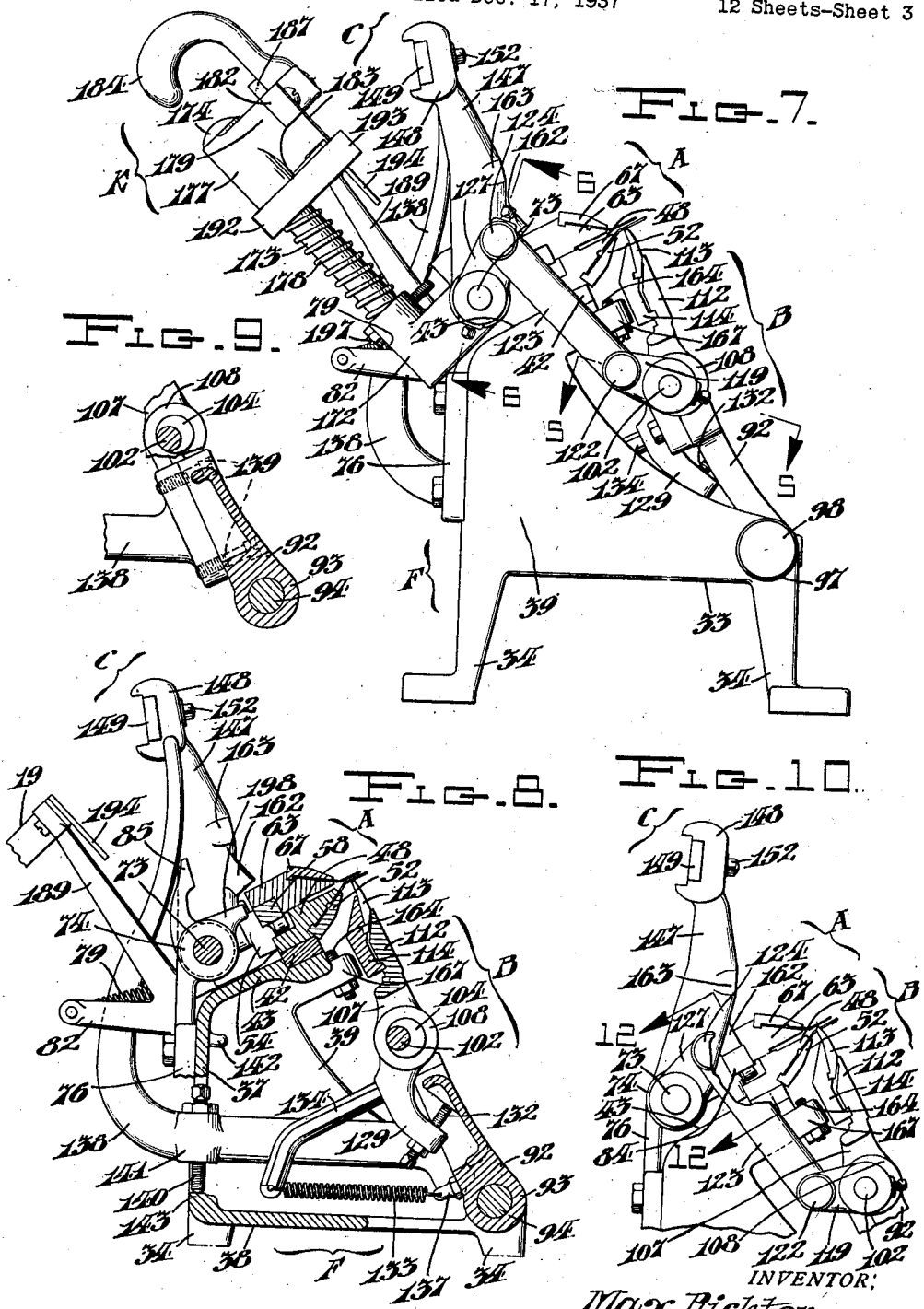

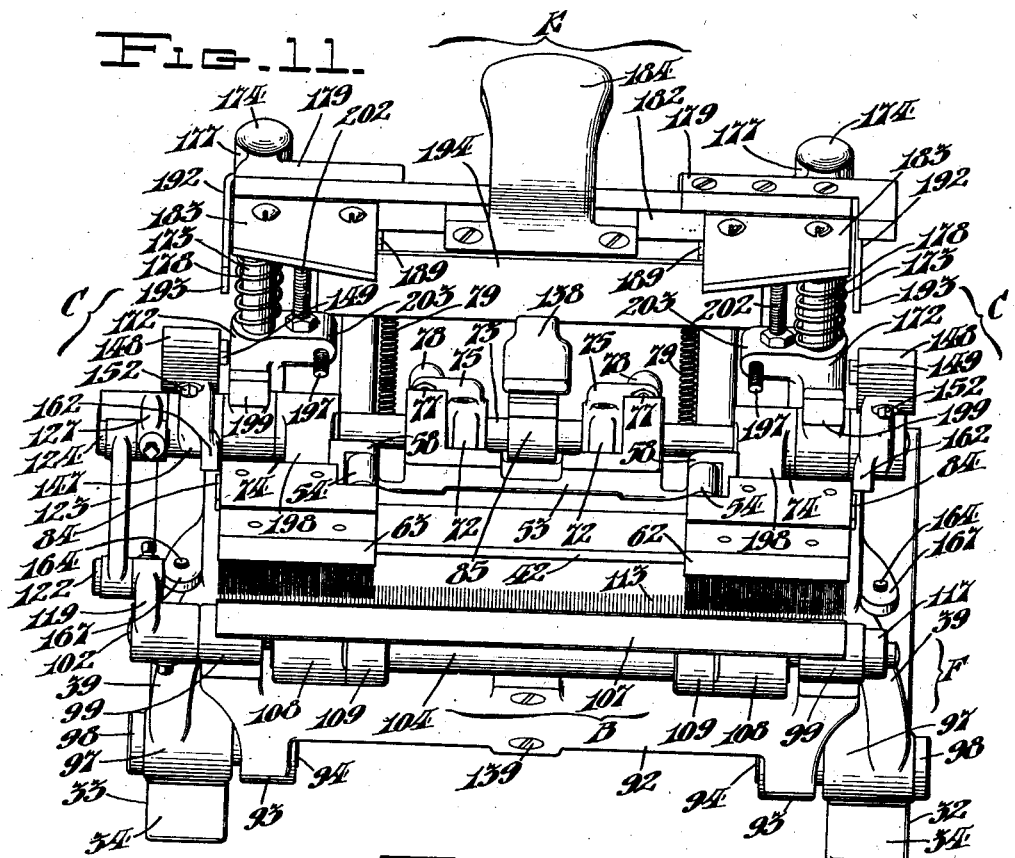
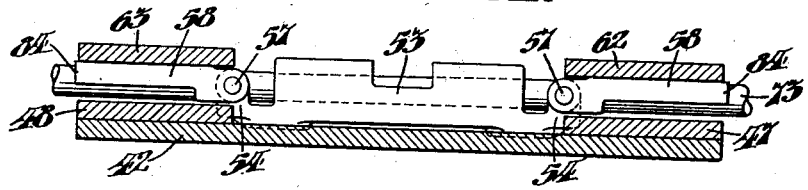
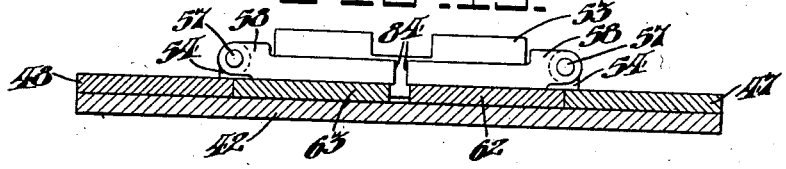

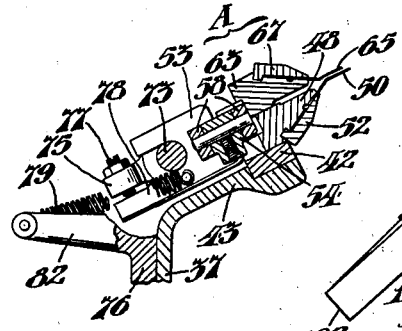

Dec. 16, 1941.  M. RICHTER  2,266,513
METHOD AND MEANS FOR PRODUCING KNITTED FABRICS
Filed Dec. 17, 1937  12 Sheets-Sheet 6
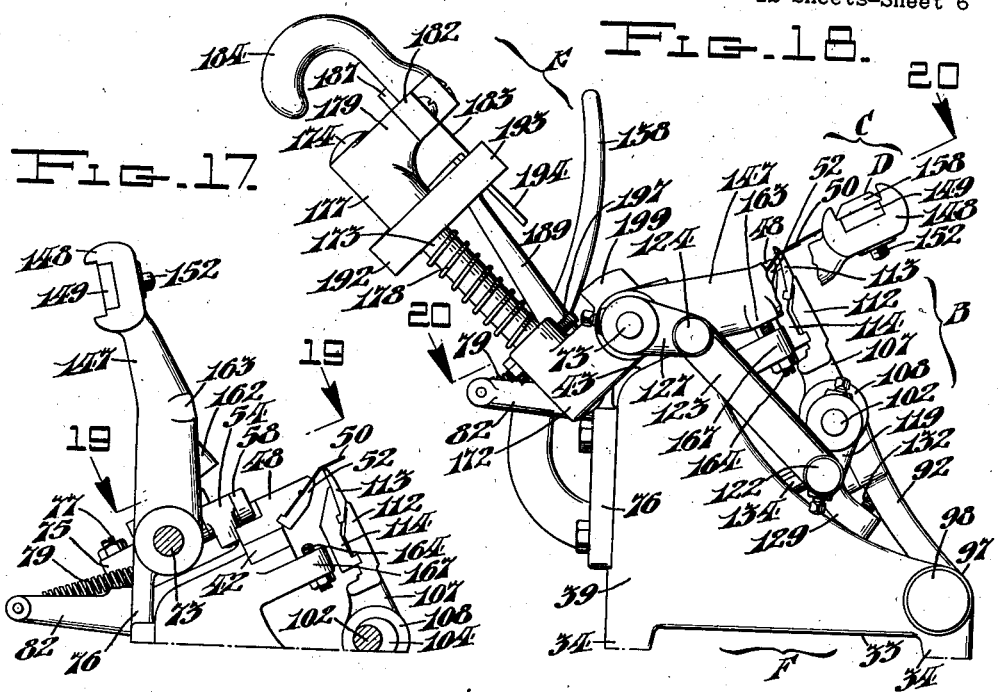
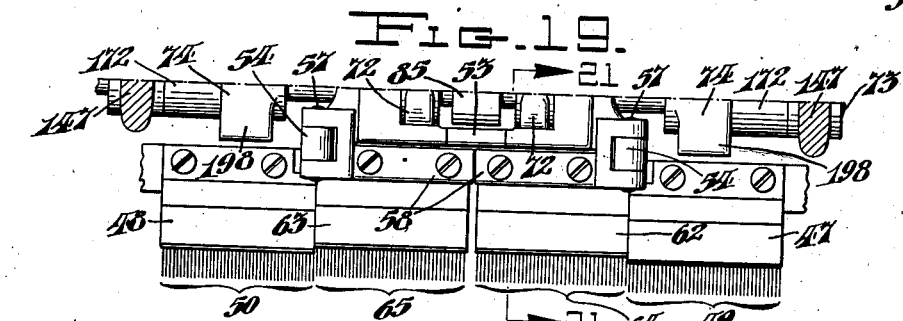
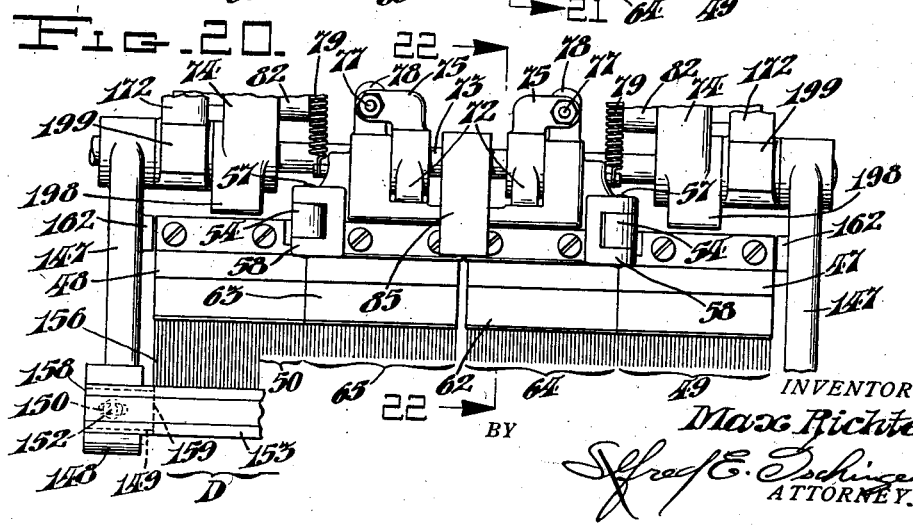
INVENTOR:
Max Richter,
BY
Alfred E. Ischinger
ATTORNEY.

Dec. 16, 1941.   M. RICHTER   2,266,513
METHOD AND MEANS FOR PRODUCING KNITTED FABRICS
Filed Dec. 17, 1937   12 Sheets-Sheet 7
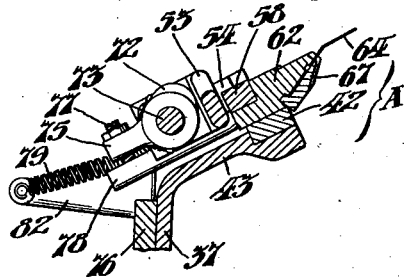
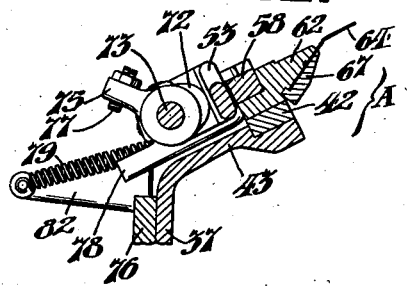
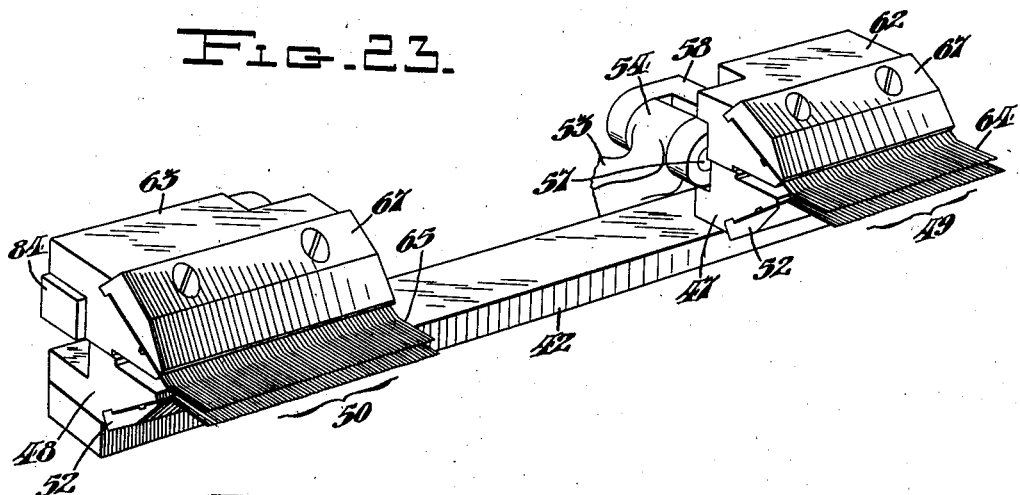
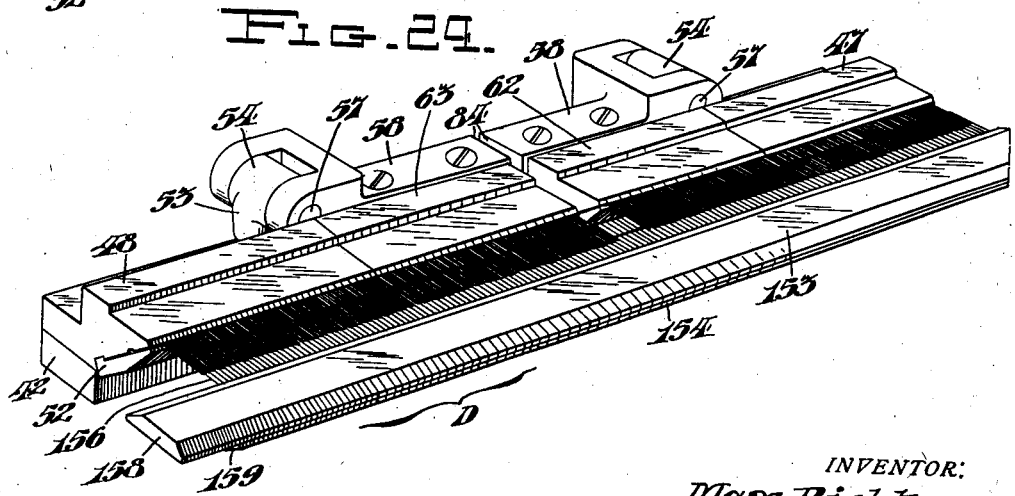
INVENTOR:
Max Richter,
BY
Alfred E. Dschinger,
ATTORNEY.

Dec. 16, 1941.                M. RICHTER                 2,266,513
             METHOD AND MEANS FOR PRODUCING KNITTED FABRICS
                        Filed Dec. 17, 1937         12 Sheets-Sheet 8
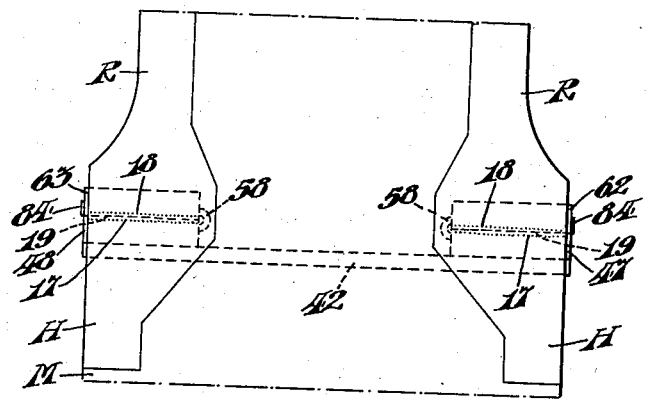
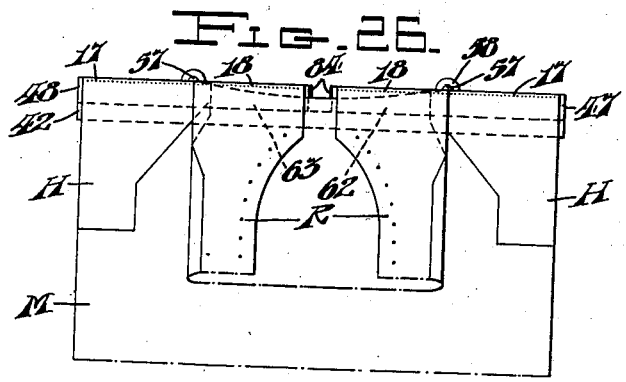
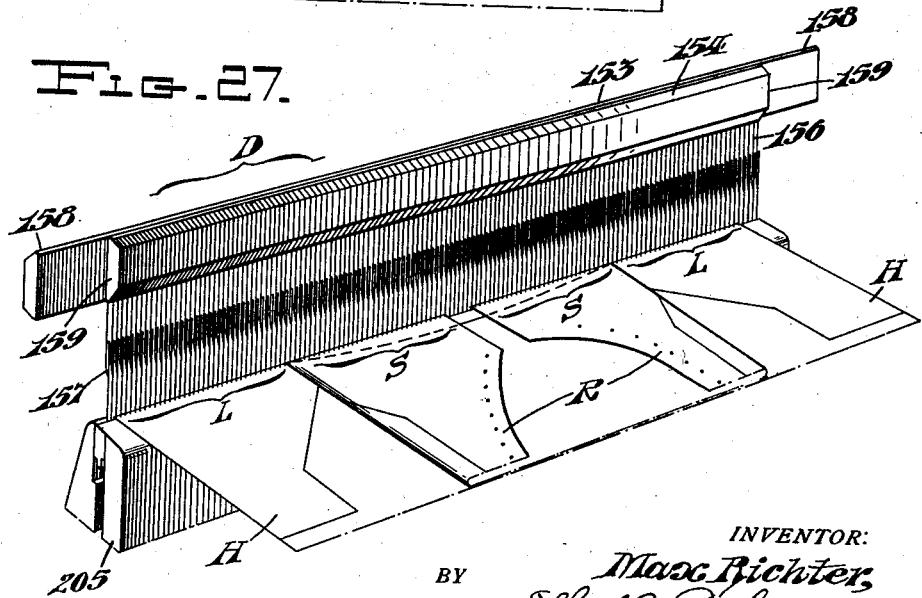
INVENTOR:
Max Richter
BY
Alfred E. Dieringer
ATTORNEY.

Dec. 16, 1941.  M. RICHTER  2,266,513
METHOD AND MEANS FOR PRODUCING KNITTED FABRICS
Filed Dec. 17, 1937  12 Sheets-Sheet 9
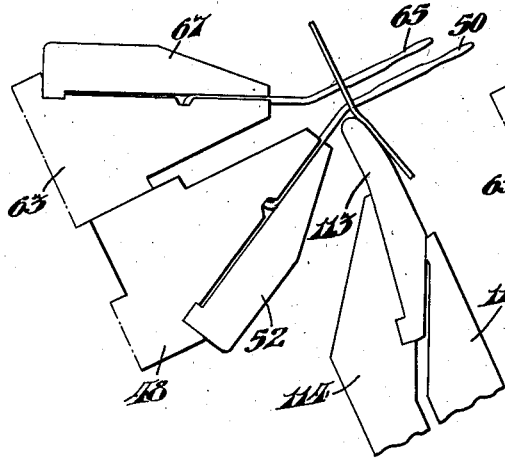
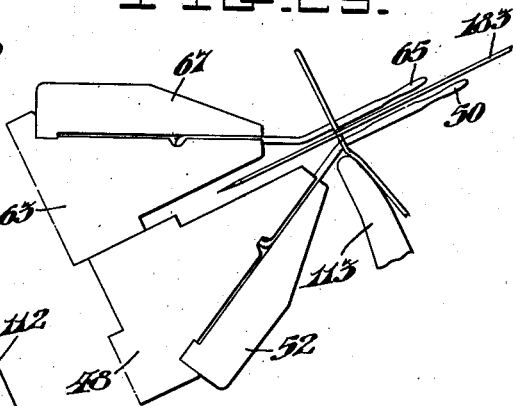
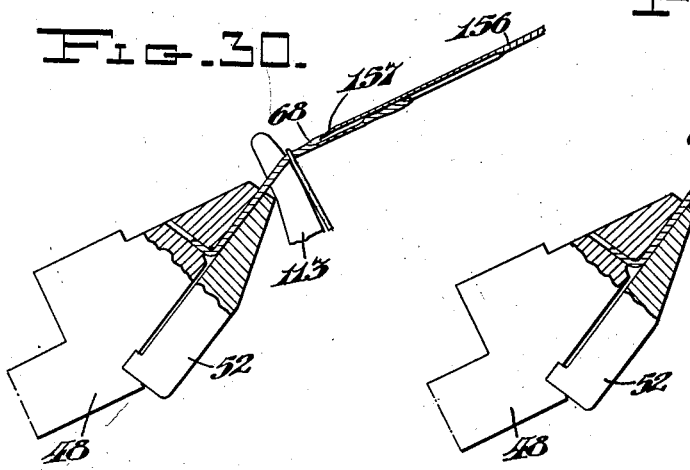
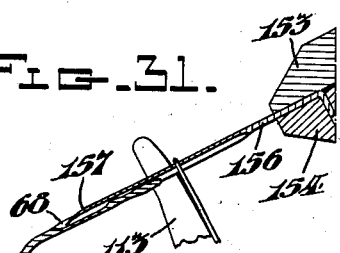
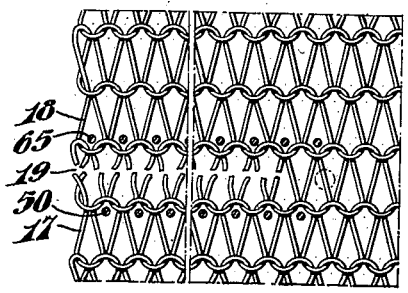
INVENTOR:
Max Richter,
BY
Alfred E. Oschinger
ATTORNEY.

Dec. 16, 1941.                M. RICHTER                2,266,513
           METHOD AND MEANS FOR PRODUCING KNITTED FABRICS
                    Filed Dec. 17, 1937      12 Sheets-Sheet 10
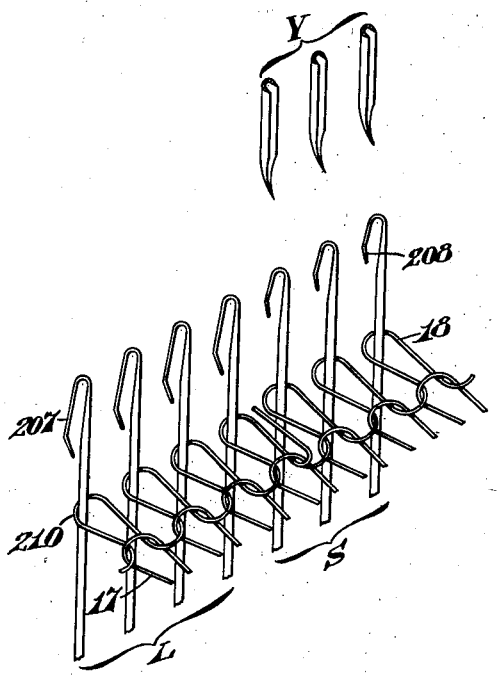
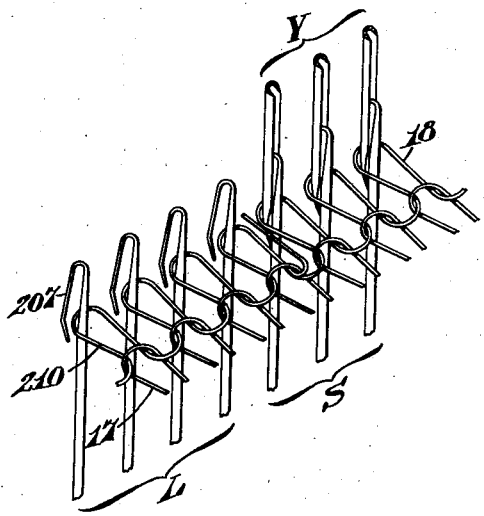
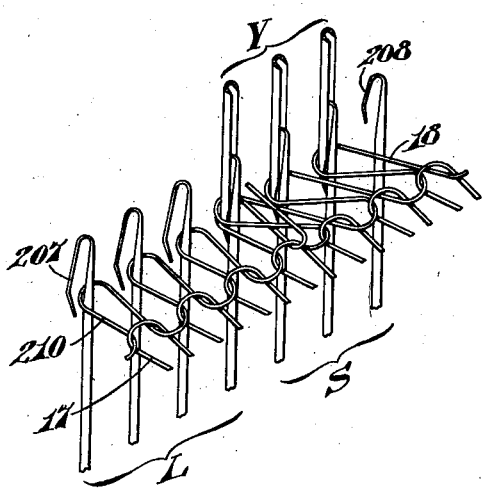
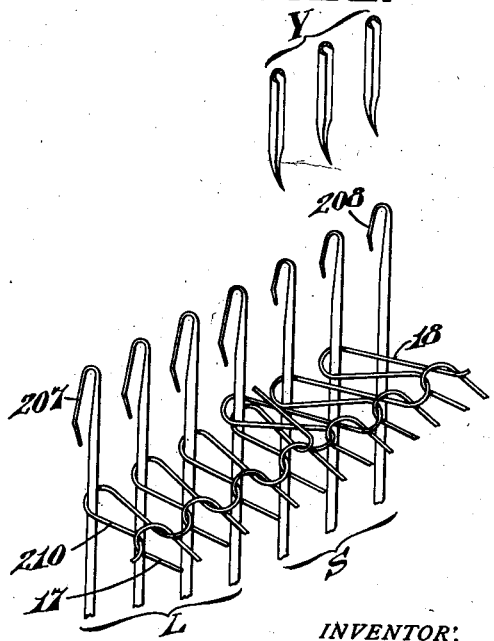
INVENTOR:
Max Richter,
BY Alfred E. Ischinger,
ATTORNEY.

Dec. 16, 1941.    M. RICHTER    2,266,513
METHOD AND MEANS FOR PRODUCING KNITTED FABRICS
Filed Dec. 17, 1937    12 Sheets-Sheet 11
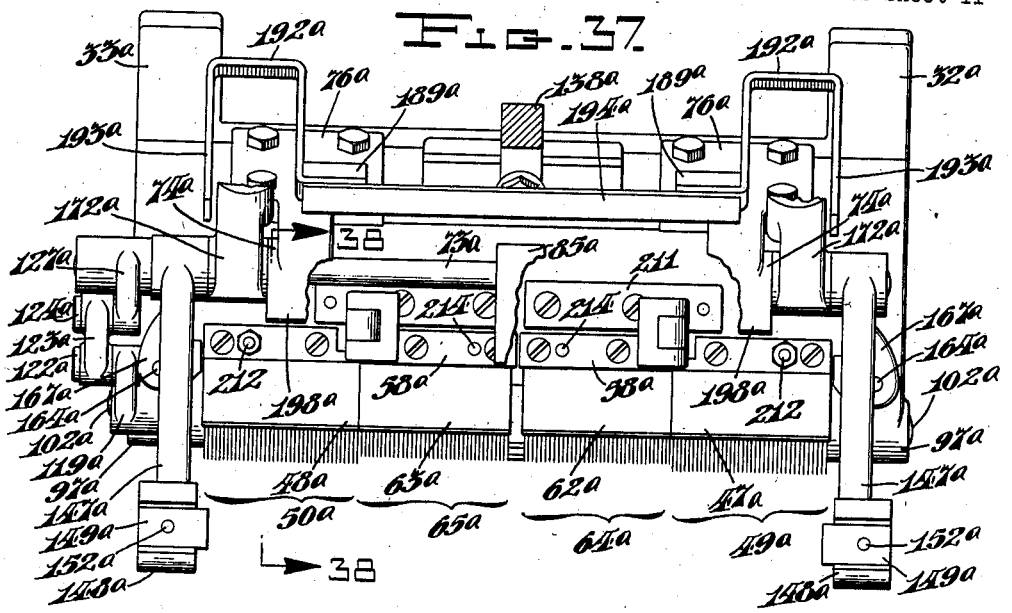
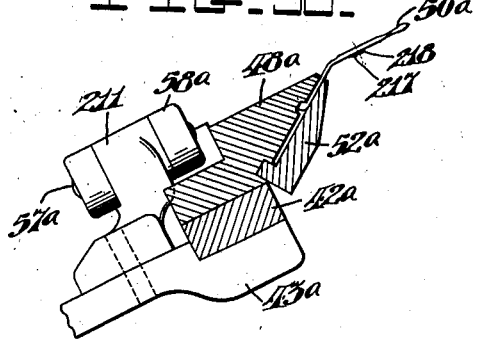
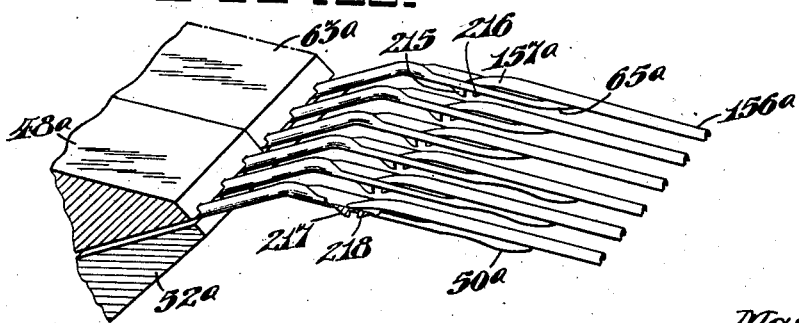
INVENTOR:
Max Richter
BY
Alfred E. Dschinger
ATTORNEY.

Dec. 16, 1941.     M. RICHTER     2,266,513
METHOD AND MEANS FOR PRODUCING KNITTED FABRICS
Filed Dec. 17, 1937     12 Sheets-Sheet 12
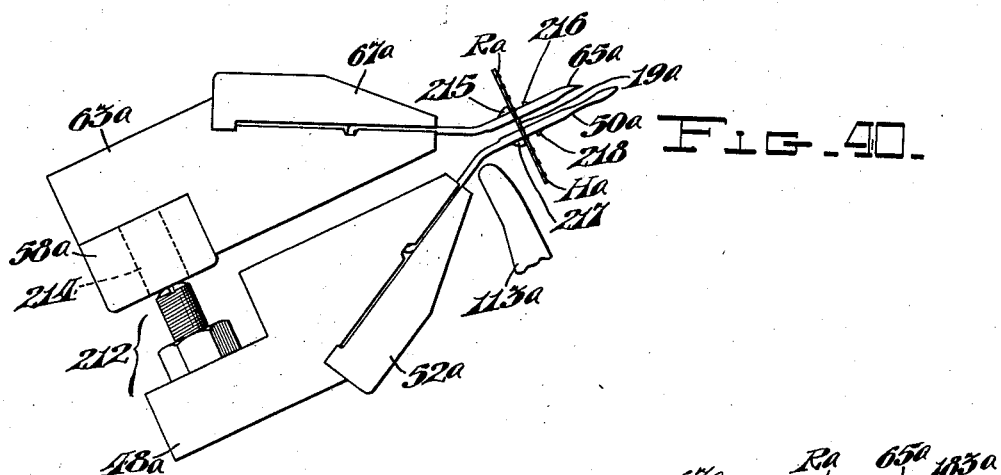
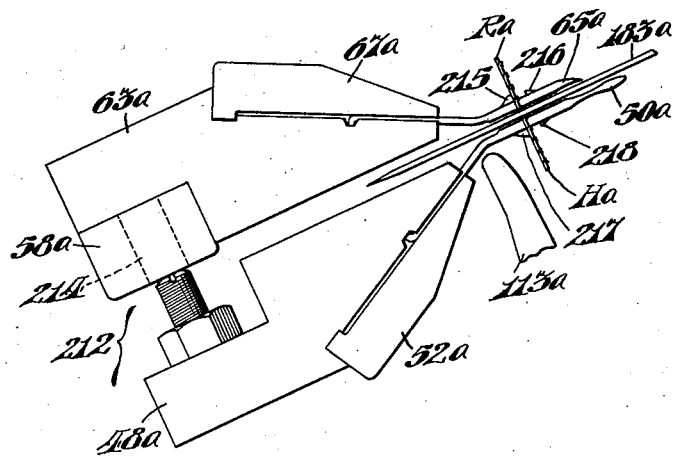
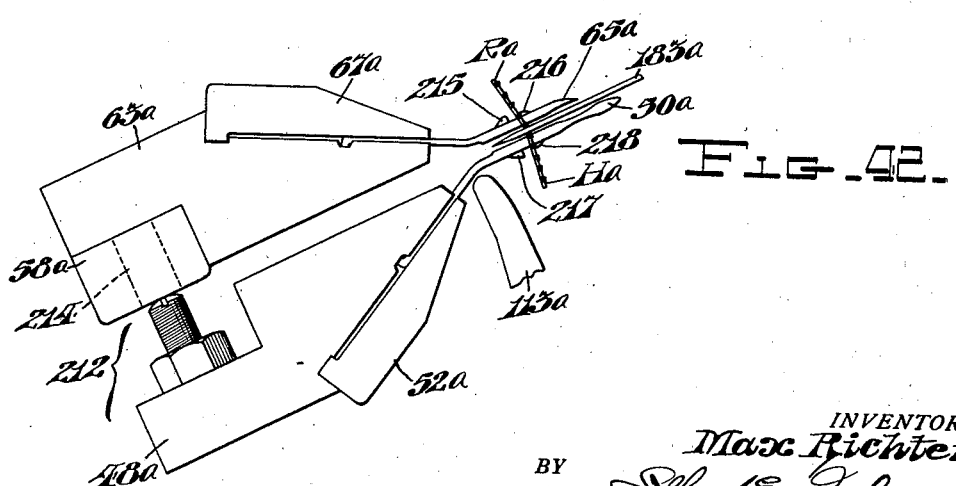
INVENTOR:
Max Richter,
BY
ATTORNEY Patented Dec. 16, 1941

2,266,513

UNITED STATES PATENT OFFICE 2,266,513

METHOD AND MEANS FOR PRODUCING KNITTED FABRICS

Max Richter, West Reading, Pa., assignor to Textile Machine Works, Wyomissing, Pa., a corporation of Pennsylvania Application December 17, 1937, Serial No. 180,388

9 Claims. (Cl. 66—148)

My invention relates to novel methods of, and means, for working knitted fabrics, and particularly to a method of and means for performing intermediate steps in the production of an article or blank formed on a plurality of machines, as in manipulating a combined leg and foot blank produced on one machine for the reception of a heel pocket produced on another machine.

In the production of knitted fabrics, such as full fashioned stockings, having pocket portions, as in the stocking heels, it has been usual to knit fabric areas, such as stocking leg blanks, on one machine, with heel tabs or the like, and to complete the formation of the entire areas or stocking blanks on another machine. By such method, even though yarn and needles are employed in the two machines as nearly alike as they can be produced and arranged, differences in the shade or the two knitted areas appear, whereby a line occurs across the instep of a full fashioned stocking, and other features of disadvantage are incurred.

To avoid these disadvantages, it has heretofore been suggested to knit an entire fabric or blank on one machine, in which instance, certain complications and delays occur that are of such character and cost as to have heretofore suggested the knitting of the entire fabrics except the pockets, on one machine, and to top and sew the pockets in place. The latter method requires separate stocks or supplies of the main and pocket fabric areas to be produced, maintained and handled, and has other disadvantages which have avoided a completely satisfactory solution of the problem.

According to the method hereof, a unit machine, which is not of itself a part of this invention, produces a blank complete with all leg and foot portions, except the heel pocket elements or tabs. This blank has, at each selvage edge, in the heel region, parallel course portions disposed in walewise register, and spaced from each other by a severing area of one or more rows of loops. By severing this area, the pocketless combined leg and foot blank can be folded about a walewise axis, at the inner end of each severed area to place the abovementioned parallel course portions associated with each edge in coursewise alignment on the loop-manipulating implements of a "heeler" machine, whereby to knit a heel tab or pocket element directly to one of the aligned course portions, and, during such knitting, to transfer the loops of the other aligned course portion to inner edge selvage loops of the tab for interknitting therewith.

By reason of the fact that, in certain instances, it is desirable to reduce each of the above-mentioned severing areas to substantially a minimum, and because of the smallness of the loops, and the delicacy of the fabric, there are certain operations, such as cutting the severing area loops, the folding of the main blank about the walewise axes as above indicated, and the topping of the aligned course portions onto the loop-manipulating implements, which have not heretofore been readily effected in commercial manner; it not being commercial, according to the prevailing standards in fabrics of certain price classes, to perform either or both of the folding and topping operations by hand. The severing operations at opposite selvages of the main blank portion have also been effected by hand, and have been thus effected one at a time.

In topping any knitted area, produced on one knitting machine, onto the loop-manipulating implements of a separate knitting machine for adding to the area, or producing a complete stocking blank, it has been usual to utilize a topping machine or device intermediate the operations of the separate knitting machines, the intermediate device therefore, although being separate from the knitting machines, also being adapted for definite cooperation with each, as the latter are adapted for cooperation with each other, such that, in a complete knitting operation or method, which requires the separate knitting machines, the intermediate device is part of the means, and performs steps of the method.

Among the objects of the invention hereof are to avoid disadvantages of each of the above-mentioned prior methods, and to improve the same and the fabrics produced thereby.

Another object of the invention is to provide novel means for practicing the improved method, in the form of mechanism for performing operations intermediate the operations of the knitting machines.

Another object of the invention is to provide a novel topping machine, as for operation in the above-mentioned method and combination hereof, that is simple and durable in construction, economical to manufacture, and effective in its operation.

Another object of the invention is to provide a device, operative in the production of knitted fabrics, in which a yarn loop-manipulating implement has novel means intermediate the ends of its shank portion for individually affecting movement of a yarn loop thereon in one or both directions oppositely along the shank portion, as in topping a fabric on groups of such implements to determine an inner position of the fabric, and also in severing the fabric between the implement groups in which the fabric is braced against the severing action, prevented from withdrawal from the implements by the withdrawal movement of the severing means, and allowed other withdrawal movement, as by knockover bits to transfer points.

Another object of the invention is to provide novel means for cutting a knitted fabric, such as cutting it simultaneously at a plurality of places, to shield the cutting means, to provide various adjustments and safety features, to facilitate topping parallel course portions by having the head ends of receiving implement groups in offset planes normal to the longitudinal axes of the implements, to position these groups and the implements thereof in alignment with each other, to transfer loops from the implements to a transfer bar, in one form, while the heads of the groups are in offset planes, and, in another form, while the heads of the groups are in coincident planes normal thereto, to provide means for moving the groups into the coincident planes, and to provide other features and advantages.

By the invention, a fabric area is knitted on one machine to have walewise offset course portions which are topped onto yarn loop-manipulating implements carried by separate bar sections, these sections are moved equivalently to turning them one hundred and eighty degrees relative to each other about an axis at adjacent ends thereof, to place the previously walewise offset course portions in line with each other, one of the thus aligned course portions is transferred from its implements on the corresponding bar section to needles of another knitting machine, the other formerly aligned course portion is transferred to yarn loop-manipulating implements in line with the needles of the latter knitting machine, further loops are knitted to the course portion on the needles, and loops of the other course portion are transferred to, and interknitted with, certain loops of the further knitted loops during the knitting of the latter.

The means, for accomplishing the above-described purpose, comprises, in general, a machine for knitting all of a blank, except the pocket element or elements, a topping machine including novel mechanical features of the invention hereof, and a machine for knitting the pocket elements to the blank; the knitting machines being of types heretofore suggested, and not altered for the purposes thereof as parts of this invention.

The topping machine comprises a base including journal bearing means for transfer bar supporting means, transfer bar supporting means journaled by the bearing means including portions for readily removably receiving a transfer bar, knockover bit mechanism including operating means providing for the transfer of yarn loops from loop-manipulating implements of the topping machine to loop-manipulating implements of the transfer bar, supporting means on the base for the machine loop-manipulating implements stationarily supported by the supporting means thereof on the base in positions corresponding to positions of end sections of the transfer bar when the latter is positioned by its supporting means, and groups of the machine implements each mounted, on the supporting means thereof on the base, for movement between a position in which the group is disposed in adjacent offset parallel plane relation to one of the end sections, and a position in which the group is disposed in alignment with the latter end section.

In particular, the thus generally-described means for practicing the above-disclosed method, includes, in the topping machine, various elements for completing the indicated construction of the latter machine and, means such as a plunger knife device, for severing yarn between the parallel course portions, and simultaneously severing yarn between like portions associated therewith, means for shielding the severing means, safety elements for preventing certain actions at certain times, to avoid injury to the operator, and damage to the machine and fabrics, means for preventing undue wear of certain elements, and other features.

With these and other objects in view, which will become apparent from the following detailed description of the illustrative embodiment of the invention shown in the accompanying drawings, my invention resides in the novel elements, features of construction and arrangement of parts in cooperative relationship as hereinafter more particularly pointed out in the claims.

In the drawings:

Figure 1 is a view, in outline, and showing major features, of a full fashioned stocking produced according to the invention, the stocking, as shown being in flat folded form;

Fig. 2 is an outline view of a portion of a blank, on a slightly reduced scale, complete except for the heel tabs, as produced on a single machine, and from which, after the tabs are provided in accordance with the invention, the stocking of Fig. 1 is produced;

Fig. 3 is a view, similar to a lower portion of Fig. 2, showing the heel tabs as formed in the final blank from which the stocking of Fig. 1 is directly produced;

Fig. 4 is a view, in front elevation, of a topping machine, or mechanism operative in the production of the knitted fabrics, constituting one example of means constructed in accordance with, and adapted for executing certain steps of the invention;

Fig. 5 is a view, partially in section and partially in elevation, taken substantially along a line 5—5 of Fig. 7, showing certain eccentric shaft and bearing members, and other elements, of a knockover bit feature of the mechanism;

Fig. 6 is a view, partially in section and partially in elevation, taken substantially along a line 6—6 of Fig. 7, showing another shaft, its bearings and correlated parts;

Fig. 7 is a view, in side or end elevation, of the device of Fig. 4, as viewed from the left of the latter figure;

Fig. 8 is a cross-sectional view of a portion of the machine, members being in elevation and portions broken away taken substantially along the line 8—8 of Fig. 4;

Fig. 9 is a detail view of certain structure, as viewed in the direction of Fig. 8, certain portions being broken away;

Fig. 10 is a view, similar to the upper portion of Fig. 7, showing the elements in a certain safety position;

Fig. 11 is a top plan view of the machine of Figs. 4 and 7;

Fig. 12 is a view, partially in section and partially in elevation, taken substantially along the line 12—12 of Fig. 10, showing certain elements for supporting loop-manipulating implement point groups in position at one stage of operation;

Fig. 13 is a view, similar to Fig. 12, showing elements for supporting the point groups in position at another stage of operation;

Fig. 14 is a detail sectional view, partially in elevation, taken substantially along the line 14—14 of Fig. 4, portions having been removed;

Fig. 15 is a view, similar to an upper portion of Fig. 7, with the elements shown in different positions;

Fig. 16 is a view, partially in plan and partially in section, of the mechanism of Fig. 4, as viewed in the direction of the arrow of Fig. 15, the parts being in the positions of Fig. 15; and portions being broken away;

Fig. 17 is a view, similar to an upper portion of Fig. 7, cross sectionally of the machine, certain elements being in different positions, and others omitted;

Fig. 18 is a view, in end elevation, similar to all except the feet of base legs of Fig. 7, with the elements in still further different positions;

Fig. 19 is a view, taken substantially along the line 19—19 of Fig. 17 showing the above-mentioned loop-manipulating point groups, and adjacent elements in certain positions;

Fig. 20 is a view, taken substantially along the line 20—20 of Fig. 18, showing the members of Fig. 19 in different positions, and other elements;

Fig. 21 is a detail sectional view, partially in elevation, taken substantially along the line 21—21 of Fig. 19;

Fig. 22 is a view, similar to Fig. 21, taken substantially along the line 22—22 of Fig. 20, showing the elements in different relative positions;

Fig. 23 is an enlarged perspective view of the above-mentioned loop-manipulating implement group structure, with the elements positioned as at one stage of operation;

Fig. 24 is a view, similar to Fig. 23, with the elements positioned as at another stage of operation;

Figs. 25 and 26 are diagrams showing machine and fabric elements in successive stages of operation;

Fig. 27 is an enlarged perspective view showing a portion of fabric, in place on needles of a needle-bar structure of a knitting machine, just after having been transferred thereto from a transfer bar, also shown in the figure;

Fig. 28 is an end elevational view of elements as viewed from the left of Fig. 23, indicating diagrammatically a portion of fabric topped on implements thereof;

Fig. 29 is a view, similar to Fig. 28, further indicating a knife element in position after having severed a course portion of the fabric between groups of the implements;

Fig. 30 is a view, partially in section and partially in elevation, of a lower structure of Fig. 28, indicating a transfer bar implement in position about to receive a fabric portion;

Fig. 31 is a view, similar to Fig. 30, indicating a portion of the transfer bar, and the transfer bar implement with the fabric thereon;

Fig. 32 is a magnified yarn loop diagram of a knitted fabric in relation to certain implements of the other figures, showing the severed course portion of Fig. 29;

Figs. 33, 34, 35 and 36 are enlarged diagrammatic perspective views of certain needles, transfer points, and other loop-manipulating implements, and loops, showing successive steps of operation in the production of the fabric, as during the production of the heel tabs of Fig. 3;

Fig. 37 is a view, partially in top plan and partially in section, certain parts being omitted and others broken away, of a modified form of topping machine constructed in accordance with the invention, the view being somewhat like Fig. 11, but having corresponding parts in different positions;

Fig. 38 is a cross sectional detail view, taken substantially along the line 38—38 of Fig. 37, corresponding somewhat to Fig. 21;

Fig. 39 is a fragmentary perspective view showing certain topping bar loop-manipulating implements of different lengths of the machine of Fig. 37, in operative relation to points of a transfer bar; and Figs. 40, 41 and 42 are end elevational views, similar to Fig. 28, of corresponding elements of the modified form of the invention, as viewed from the left of Fig. 37, showing certain parts as positioned at different stages of operation.

In the drawings and description, the topping machine is shown in full, but, as to the knitting machines, only those parts necessary to a complete understanding of the invention have been set forth; further information as to the construction and operation of other elements not herein specifically pointed out, but which are usual and well known, and shown in the pamphlet entitled "Full Fashioned Knitting Machines," copyright 1920, in the "Reading" Full Fashioned Knitting Machine Catalogues, copyright 1929 and 1935, published by the Textile Machine Works, Reading, Pennsylvania, a pamphlet entitled "Knitting Machine Lectures," published in 1935, by the Wyomissing Polytechnic Institute, Wyomissing, Pennsylvania, and in the above-mentioned copending application.

Fabrics produced

Referring to Fig. 1, one example of the application of the method is in producing a full fashioned stocking comprising a folded double layer welt portion W, a leg portion M, an upper reinforced portion H constituting one of a pair of like portions in a heel area, a reinforced portion R constituting one of a pair of like portions in a sole area, a diamond point toe portion T, and a heel pocket P.

Outline of the method

In producing the article or stocking of Fig. 1, the blank of Fig. 2 is first produced on a unit machine, and comprises the welt portion W, the leg portion M narrowed at a knee area 12, and at a lower leg area 14, the upper reinforced heel portions H, and the reinforced sole portions R associated with opposite selvages of the blank, the diamond point toe portion T, a loose course 15, and a ravel area 16.

Between the areas H and R, at each side of the blank, are formed loose course portions 17 and 18 in walewise register, the course portion 18 of which may have a greater number of loops than the portion 17, and between which is formed a severing course or area 19.

By severing the course portions 19, to separate the portions H and R, by folding (see Fig. 25) the blank about an instep course or line J, and again folding the blank about a walewise line adjacent to the inner end of each area 19, the course portions 18 are displaced from the initial walewise register thereof with the course portions 17, as in Figs. 2 and 24, and the course portions 17 and 18 placed in alignment with each other (see Fig. 26) in different coursewise positions for topping, through the intermediary of a novel topping machine hereinafter particularly pointed out, onto needle-like implements of another knitting machine for continuing the production of the article.

The latter produces heel tabs E, as shown in Fig. 3 and as further hereinafter set forth relative to Figs. 33 to 36, inclusive, having a given number of course portions knitted from the course portions 17. The loops of the loose course portions 18 which, in the example given, are of larger number than the course portions of the tabs, are transferred, and interknitted, to selected loops of the inside selvage edges of the tabs, and distributed substantially throughout the length of the latter, although they may be of the same number transferred to each inner selvage edge loop of the tabs, or the tabs may have additional courses after the last transferred loops of the course portions 18. Also, the tabs E, in the example given, are narrowed in selected courses, fewer than the total number of course portions in the tabs, disposed in predetermined positions along the tabs, although, in this instance also, the number, kind and positions of the narrowings may be variously selected.

As indicated in Fig. 3, short loose course portions 22 and ravel areas 23 are formed at the ends of the tabs E for looping and stitching the course portions 22 to each other, as shown in Fig. 1, in a series of loopings 24 extending along the line of a usual back seam for a short distance, as indicated by a bracket, from the upper end of the reinforced sole portion R, for a short distance along the pocket. A short back seam 27 is formed, between the selvages of the sole portion R, from the usual loopings of the toe portion T, to the lower end of the heel pocket P, coincident with the lower end of the loopings 24, and a long back seam 28 is formed, from the upper end of the loopings 24, to the top of the stocking; the long seam 28 thereby being formed, for a short distance 29, between the outside edges of the heel pocket portions at opposite selvages of the blank.

Topping machine

Referring particularly to Figs. 4, 7 and 11, a topping machine of one exemplary form included in the invention, comprises, in general, a base or frame F, a topping bar structure A, a knockover bit mechanism B, a transfer bar support C, and a yarn severing device K.

The frame

The frame F, constructed of suitable material, such as cast iron, comprises right and left stands 32 and 33, respectively, having base legs 34, and jointed by transverse web-like rear and underside portions 37 and 38, respectively (Fig. 8), which are joined by end webs 39.

Topping bar structure

The topping bar structure A (see Figs. 8, 11 to 17, and 19 to 24) comprises a bar 42 secured to an upwardly and forwardly sloping extension 43 (see particularly Figs. 8, 14, 21 and 22) of the rear web 37 of the frame F. The bar 42 extends substantially entirely along the machine between the right and left stands 32 and 33, respectively (see Figs. 11 and 23). Short bar sections 47 and 48, of needle bar character, are fixed to the right and left hand portions, respectively, of the bar 42, and support groups, or bank sections, of needle-like loop-manipulating topping point implements 49 and 50, respectively, which are held in place by clamps 52; the short topping bar sections 47 and 48 corresponding to, and being for opposite parallel register with the loop-manipulating implements or points of a transfer bar, as will appear.

A hinge bracket 53, fixed to the extension 43, has hinge pin journals 54 for hinge pins 57 of hinges 58 which carry, in fixed relation thereto, short bar sections 62 and 63, of needle bed character, associated with the above-mentioned short bar sections 47 and 48, respectively. The bar sections 62 and 63, support groups of needle-like loop-manipulating topping point implements 64 and 65, respectively, which are held in position by clamps 67. Each implement of the groups 49, 50, 64 and 65, is provided with a groove 68 (Figs. 30 and 31) for cooperation with a transfer point, as will hereinafter appear.

In the positions of the elements of Figs. 4, 7, 8, 11, 12, 14, 15, 16, 23, 28 and 29, in which the implement groups 64 and 65 are disposed above the groups 49 and 50, respectively, the head ends of the implements of the lower groups 49 and 50 are offset forwardly, in a plane normal to the longitudinal axes of the implements, from the corresponding plane of the head ends of the implements of the groups 64 and 65, respectively, this arrangement greatly facilitating topping on rows of loops adjacent to each other in one fabric, such as the loose course portions 17 and 18 at each selvage of the blank of Fig. 2, by first topping on one row and then the other. With the rows thus topped on, they are next separated, by severing loops between the course portions 17 and 18 at each selvage edge of the blank, as will appear, such that the bar sections 62 and 63 can be pivoted about the axes of the hinge pins 57, from the positions of Fig. 23, and the other above-mentioned figures, to the positions of Fig. 19. As better seen in Fig. 16, the implements of the groups 64 and 65 lie in positions vertically above the spaces between the implements of the groups 49 and 50, respectively. When the groups 64 and 65 are moved on their hinges one hundred and eighty degrees, to the positions of Fig. 19, the next adjacent implements of the groups 49 and 64 are spaced apart by a one needle distance, as are also the next adjacent implements of the groups 50 and 65.

In this form of the invention, the implement groups, as positioned in Fig. 23, having the above-mentioned offset head end relation, retain this relation when the groups 64 and 65 are moved one hundred and eighty degrees, to the position of Fig. 19.

Means, for moving the groups 64 and 65 from the positions of Fig. 19 to the positions thereof in Figs. 20 and 24 comprises cams 72, on a shaft 73 journaled in bearings 74 on brackets 76 secured to the frame F for camming cooperation with the hinge bracket 53, and having arms 75 supporting adjustable stop pins 77 for engagement with extension 78 of the bracket 53. The latter feature limits the counterclockwise movement of the shaft 73, as viewed in Figs. 21 and 22, and determines the upper or inoperative position of the transfer bar support C which is also fixed to the shaft 73. Springs 79, connected between the hinge bracket 53 and arms 82 of the brackets 76 at the rear of the frame F, oppose the action of the cams 72, so that the bracket 53, and its associated implement groups, are moved forwardly by the cams, and rearwardly by the springs. Thus, when the transfer bar support C, which is fixed to the shaft 73, is brought forward from its upper rear inactive position to its lower forward active position, as will appear, the groups 64 and 65 are cammed forwardly to place the head ends of all the implements in the same plane normal to the axes thereof, as shown in Figs. 20 and 24. The hinges 58 have extensions 84 for cooperation with the transfer bar support C, and the shaft 73 carries a dog 85 for cooperation with the topping bar sections 62 and 63, as will appear.

Knockover bit mechanism

The knockover bit mechanism B (Figs. 4 to 11, inclusive, 17 and 18) comprises a lower swing frame 92 extending across the front of the machine (Fig. 4) having depending end bearing portions 93 journaled on trunnions 94 which are supported in portions 97 of the frame F and have heads 98 at the outer sides of the right and left stands 32 and 33.

Upwardly projecting end portions 99, spaced further apart than the lower end bearing portions 93, carry a shaft 102 having end portions of one diameter, and an intermediate portion 104 of larger diameter and offset radially from the axis of the end portions of the shaft, thereby being eccentric thereto.

An upper swing frame 107 has depending end bearing portions 108 journaled on the eccentric shaft portion 104 and held in position longitudinally of the shaft by collars 109 secured to the portion 104 by set screws. The frame 107 has an upper portion 112 constituting a bed for knockover bits 113 that are held in position on the bed 112 by a clamp 114. Secured to the shaft 102, at the right-hand end thereof, as viewed from the front in Fig. 4, is a positioning collar 117 secured to the shaft by a set screw, and, at the left-hand end of the shaft 102, a lever 119 is fixed to the shaft. The lever 119 carries a fixed pin 122 pivotally connected to one end of a link 123, the other end of which is pivotally connected, by a pin 124, to a lever 127 that is fixed to the shaft 73 (Fig. 6) which, when the transfer bar support means C is moved to active position, as will appear, operates through the lever 127, the link 123, the lever 119, and the shaft 122 and its eccentric portion 104, to move the knockover bits 113 upwardly, from the position of Fig. 17 to the position of Fig. 18.

The upper swing frame 107 has downwardly projecting extensions 129 of its end bearing portions 108, each carrying a screw 132 for adjustable engagement with the lower swing frame 92, against which it is held, by a tension spring 133, extending between an arm 134 on the upper swing frame, and a projection 137 on the lower swing frame. By operating the screw 132, the knockover bits 113 may be adjusted relative to the loop-manipulating implements.

A handle 138, secured to the inner, or rear, side of the lower swing frame 92, as by screws 139, extends rearwardly and upwardly therefrom. By pulling the upper part of this handle forwardly, the knockover bits are operated to transfer loops from the topping bar loop-manipulating implements to transfer bar loop-manipulating implements, as will further appear. An adjustable contact screw 140, in a boss 141 of the handle 138 operates between upper and lower stop portions 142 and 143 on the rear web 37 of the frame F.

Transfer bar support

The transfer bar support C (Figs. 4, 7, 8, 10, 11 and 15) comprises brackets or lever arms 147 fixed to the shaft 73 at opposite ends of the machine, the arms 147 being duplicates, and each comprising a free-end channel portion 148 having an insert element 149 therein. The element 149 has a slot 150 (Fig. 20) extending longitudinally of the machine, or in the direction of the shaft 73, whereby, in cooperation with a screw 152, the insert may be adjusted in said direction to enable the support C to accurately receive a transfer bar D, which is shown in Fig. 27. As shown in the latter figure, the bar D comprises two bars 153 and 154, between which are held transfer points 156 having curved ends 157. The bar 153, being longer than the bar 154, and centered longitudinally relative to the latter, thereby has projecting ends 158 which are adapted to be received into the channel portions 148 over the insert elements 149. When the ends 158 are thus placed, ends 159 of the bar 154 are then in line with, and between, the insert elements 149, whereby with the latter elements properly adjusted by the screws 152, as above set forth, to closely abut the ends 159, the transfer points 156 will be accurately aligned with the loop-manipulating implements of the groups 49, 50, 64 and 65 of the topping machine.

With the bracket arms 147 in the upper or inoperative positions, as shown in Figs. 4 and 7, and the bar sections 62 and 63 over the topping bar sections 47 and 48, respectively, as shown in Fig. 11, the arms 147 may not be entirely lowered to operative positions, by reason of an engagement that will take place between bosses 162 on the arms 147 and the extensions 84 of the hinges 58, as shown in Fig. 10; this feature preventing the inadvertent operation of the arms 174, at such time, which would move the knockover bits upwardly to positions between the topping bar implements whereby an attempt to move the implement groups 64 and 65 from the positions of Fig. 4 to the positions of Fig. 19, would damage the knockover bits and implements.

With the bracket arms 147, which are fixed to the shaft 73, in lowered positions, the dog 85, which is also fixed to the shaft 73, is disposed over the hinged portions 58 in the positions thereof of Fig. 20, in engagement therewith, to prevent any attempt to raise the sections 62 and 63, or turn them about the hinge pins 57, because, at this time, the knockover bits project above the implements of the groups 49, 50, 64 and 65, whereby such attempt would tend to damage both the implements and the bits associated with the bar sections 62 and 63.

The lower positions of the arms 147 are determined by engagement of bosses 163 on the arms, and adjustable contact screws 164 in projections 167 on the frame F; the upper position being limited by the stop pin 77 and the extension 78 (Figs. 21 and 22), as hereinbefore set forth.

Yarn severing device

The yarn severing device K (Figs. 4, 7, 8, 11, 15, 16 and 18) comprises brackets 172 journaled on the shaft 73, adjacent to the ends thereof, respectively, for turning movement relative thereto, and for rigidly supporting studs 173 having heads 174. Plungers 177 are longitudinally slidably mounted on the studs 173, and normally biased outwardly against the stud heads 174, by helical compression springs 178 surrounding the studs 173 and each acting oppositely against one of the brackets 172 at one end and against the associated plunger 177 at the other end. Brackets 179, on the plungers 177, support a bridge or bar 182, extending between the plungers, on which are supported knives 183 having sloping cutting edges adapted to cut yarn in the severing areas 19, to sever the yarn in each, as indicated in Fig. 32. A handle 184 and a safety stop 187 are mounted on the bar 182.

The brackets 76 have arms 189 on which are mounted guard means 192 including an end shield element 193 and an apron 194. The end shield element 193 protects the operator against injury to his hands by contact with the knives. The apron 194 shields the edges of the knives in inoperative position and also such that, if while in inoperative position, the plungers 177 should be depressed until the bar 182 engages the top of the arm 189, the edges of the knives will still be above the bottom of the apron 194.

The safety stop 187 is provided to prevent inadvertent operation of the knives when the transfer bar is in operative position on the machine, or the brackets 147 are in position to receive the transfer bar in such position. In such case, should the severing device be brought forwardly and an attempt made to depress the plungers, the stop 187 will engage the top end of the right hand bracket 147 to prevent any damaging motion of the knives toward the knockover bits which, at such time, are in upper position.

In the forward, or operative position of the yarn-severing device (Fig. 15), screws 197, carried by the brackets 172, engage lugs 198 on the stationary bracket 76. Also, when the device is moved to this position, elements 199 on the brackets 172 assume positions behind, and against, the hinges 58 to brace the same against forces which may be imposed thereon by the severing action.

With the parts properly in operative position, as indicated in Figs. 15 and 16, when the handle 184 is thrust toward the rear of the machine, the severing action is effected, and the severing movement of the plungers 177 is limited by engagement of lugs 201 with adjustable stop screws 202 mounted in portions 203 of the bracket 172.

*Heel tab producing means*

After the blank has been formed without the heel tabs on the first above-mentioned machine, and topped onto the above-described topping machine by means of the transfer bar D, it is transferred from the latter machine to a machine for producing the heel tabs. The heel tab machine includes, as indicated diagrammatically in Figs. 33 to 36, inclusive, standard needles L and special needle-like loop-manipulating implements S. The loop-manipulating implements L and S are all supported on one needle bar 205 (Fig. 27), as are the needles in a usual straight or full fashioned knitting machine. The heeler machine further includes usual transfer points Y associated with the implements S, and has narrowing points (not shown) for narrowing in the heel tabs in a usual manner.

The standard needles L have beards 207 of usual length, herein referred to as long beards by reason of their relation to beards 208 on the implements S which are shorter than the standard needle beards 207.

*Operation*

With the short needle bar sections 47, 48, 62 and 63, and the other parts of the topping machine, positioned as in Figs. 4, 6, 7, 8, 11, 12, 14, 23, 25, 28 and 29, the blank of Fig. 2 is topped onto the implements of the topping machine, as indicated in Figs. 25 and 32, to place the needle loops of loose course portion 17 at opposite selvages of the blank on the implement groups 49 and 50, these implements, as better seen in Figs. 28 and 29, protruding forwardly of the implements of the groups 64 and 65 to receive the course portions 17 a little in advance of the reception by the groups 64 and 65 of the sinker and divider loops of course portions 18, whereby to facilitate the topping operation, by not requiring the topper to handle the course portions 17 and 18 at the same time. With the loops of the course portion 17 started over the ends of the implements of the groups 49 and 50, it is then easier to similarly start the loops of the course portions 18 over the ends of the implements of the groups 64 and 65. After this operation has been effected, both sets of course portions 17 and 18, and the adjacent fabric, are pressed further inwardly along the implements to a position against the knockover bits 113, as indicated in Fig. 28.

With the blank thus topped, the topper grasps the handle 184 to pivot the severing device K about the axis of the shaft 73, from the position of Fig. 7 to the position of Fig. 15, in the latter of which the handle 184 is given a thrust movement to move the plungers 177 and the knives 183 against the action of the springs 178 to a position indicated in Fig. 29. This action causes the knives 183 to progressively sever the severing area course portions 19 from near the inner ends thereof outwardly through the selvage edge. With the fabric thus severed, and the severing device K returned to its position of Fig. 7, the short bar sections 62 and 63 may be pivoted about the axis of the hinge pins 57 to move the implement groups 64 and 65 and other parts from the positions of Fig. 4, 11, 12, 23, 25 and 28 to the positions of Figs. 19 and 26, whereupon the transfer bar supporting brackets 147 are pivoted forwardly about the axis of the shaft 73 from the positions of Figs. 4, 7 and 8, to the positions of Figs. 18 and 20, wherein the transfer bar D is positioned, as indicated in Figs. 20 and 24, relative to the implement groups 49, 50, 64 and 65. During the forward movement of the transfer bar brackets 147, since the latter are fixed to the shaft 73 to which the cams 72 are also fixed, the latter act against the hinge bracket 53 to move the implement groups 64 and 65 from the positions of Fig. 19, in which the ends of the implements are in offset relation to the ends of the implements of the groups 49 and 50 in planes normal to the axes of the implements, to the positions of Fig. 20, in which all the point ends of all the implements are in one such plane. Also, during the above-mentioned movement, the dog 85 is moved to position over the topping bar sections 62 and 63 to hold the same rigid relative to each other against accidental movement about the hinge pivots thereof.

Further, during the movement of the transfer bar supporting brackets 147, the shaft 73 operates the lever 127, the link 123 and the lever 119 to turn the shaft 102 whereby the eccentric intermediate portion 104 thereof raises the knockover bits 113, as from the position of Figs. 28 and 29 to the position of Fig. 30, in readiness to slide the loops from the topping bar implements to the transfer points. The latter operation is effected, when the handle 138 is moved forwardly, or clockwise about the axis of the trunnions 94, as viewed in Fig. 8, whereupon the loops are moved from the topping bar implements to the transfer points, as indicated in Fig. 31. After this operation, the transfer bar D, with the fabric thereon, is taken to the heeler machine and placed in position, as in Fig. 27, over the implements L and S to which the fabric is transferred.

In the next step of the method, yarn is laid to each group of the long beard needles, and interknitted thereby to the course portion 17 to form a course portion 210, as indicated in Fig. 33, but, since no yarn is laid to the associated short beard implement group, the loops of the course portion 18 will be moved out of coursewise alignment with the course portion 17, and into such alignment with the new course portion 210, as indicated in Figs. 33 to 36, inclusive, ready for pick up by the points Y thereabove to complete the first transfer. In Fig. 34, the points Y have descended into the loops of the course portion 18, closing the short beards of the implement S, after which the loops are picked up from the implements S and transferred a one-needle distance and dropped onto the implements L, as indicated in Fig. 35. As indicated in Fig. 36, the first transfer has been completed and the points Y have been raised to position for repetition of the cycle, after the laying of a subsequent course portion or portions to the needles L.

The operation, after the above-described initial steps, may be varied as to which courses of loops formed on the long beard needle groups shall be narrowed, and to which courses the loops on the short beard implements shall be transferred. However, in the example given, the next transfer takes place after the knitting of one or two courses, and the ratio maintained of approximately two transfers in every three courses to the end of the heel tabs.

The narrowings do not begin, in the example given, until after about half of each heel tab has been knitted, when ten narrowings are inserted in the remaining forty-five courses such that the first five narrowings are inserted in every fifth course and the next five narrowings are inserted in every fourth course, or the operation is effected in a similar arrangement to the end of the heel tabs.

At the end of the above-described operations, the blank is completed, with the heel tabs E in place, as shown in Fig. 3, after which the loose course portions 22 are looped to each other to form the loopings 24, and the usual loopings are effected at the toe end of the blank, and the back seams 27 and 28 formed, the seam 27 from the toe loopings to the lower end of the heel pocket P, and the seam 28 from the upper end of the loopings 24 to the top of the stocking.

Modification

In the modification of the topping machine of the invention illustrated in Figs. 37 to 42, inclusive, in which corresponding parts are designated by corresponding reference characters, with the subscript "a," the construction and operation are similar to that above set forth, with the exception that, instead of moving the implement groups 64a and 65a forward from the position of Fig. 37, corresponding to Fig. 19, to a position corresponding to that of Fig. 20 in which the ends of the implements are all placed in line in the first-described form of the topping machine, the implements are allowed to remain in the positions of Fig. 37 for transfer of the loops to the transfer points 156a.

In the first-described form of topping machine, the implements of the groups 49, 50, 64 and 65 are of the same overall lengths, whereas in the modified form, the implements of the groups 64a and 65a are of shorter overall lengths than the implements of the groups 49a and 50a.

The modified construction eliminates the cams 72, the movable hinge bracket 53, and other elements, but is otherwise similar to the first-described topping machine. Fig. 38 shows a stationary hinge bracket 211 fixed to an extension 43a of the rear web of the machine frame, in its relation to a bar 42a, a clamp 52a and a stationary bed section 48a for holding the implements of the group 50a.

As better shown in Fig. 40, an adjustable stop screw and nut device 212 is provided in the bed section 48a whereby the pivotally mounted implements 65a can be placed in accurate parallel relation to the stationary implements 50a. The screw bears against a steel insert 214 in the hinge 58a to avoid mutilation of the latter and misalignment of the implements.

Fig. 39 indicates how the transfer bars 156a cooperate simultaneously with the long implements 50a and the short implements 65a for transfer of the loops by the knockover bits 113a, as in connection with Figs. 30 and 31 of the first-described topping machine.

In the positions thereof in Figs. 40, 41 and 42, a portion of the elongated shank of each short implement 65a has an upwardly projecting element 215, of certain size and position thereon, and a smaller upwardly projecting element 216 at a position forwardly of the element 215; these elements having adjacent surfaces or shoulders perpendicular to the implement 65a facing each other, and farthermost outer longitudinal side surfaces sloping gradually from the tops of the elements 215 and 216 away from said perpendicular surfaces rearwardly and forwardly, respectively, and merging into the adjacent top longitudinal surface of the implement.

Each long implement 50a has downwardly projecting similar large and small elements 217 and 218, respectively.

When the blank portions Ra—Ha are first topped onto the implements 50a and 65a, with the severing course 19a therebetween, as shown in Fig. 40, the fabric passes freely over the small elements 216 and 218, and engages the near shoulders or faces of the larger elements 215 and 217 which act as stops limiting the inward movement of the fabric toward the knock-over bits 113a.

As indicated in Fig. 41, the large elements 215 and 217 again act as stops, preventing inward movement of the fabric on the elements 50a and 65a, when the knife 183a is thrust against the fabric, thus bracing the fabric against the severing action of the knife preventing yield of the fabric against the cutting thrust movement, and conducing to a clean cutting action.

As indicated in Fig. 42, upon withdrawal of the knife 183a, any tendency of the fabric to cling to the knife sides for withdrawal movement with the knife is stopped by the small elements 216 and 218 which offer enough resistance to withdrawal of the fabric by the knife, but do not oppose to any appreciable extent other withdrawal movement of the fabric, as by the knockover bits 113a to the transfer points 156a.

Of course, the improvements specifically shown and described by which I obtain the above results, can be changed and modified in various ways without departing from the invention herein disclosed and hereinafter claimed.

I claim:

1. In a device operative in the production of knitted fabrics, a yarn loop-manipulating implement including an elongated shank portion embodying a pair of elements spaced along the shank portion from each other intermediate the ends of the shank portion for engaging a loop and affecting movement thereof along the shank portion in opposite directions, each of said elements constituting a side projection on the shank portion having a surface substantially perpendicular to the shank portion facing along the shank portion toward the corresponding face of the other of said projections, and the outer longitudinal surface of at least one of said projections merging gradually along the shank portion away from said faces into the longitudinal side of the shank portion.

2. In a device operative in the production of knitted fabrics, a plurality of groups of yarn loop-manipulating implements, means for supporting said groups in parallel-plane relation to each other, and means moving generally lengthwise of said implements for severing yarn between said groups in said relation of the groups, said implements having means thereon for bracing a fabric against the severing action of said severing means.

3. In a device operative in the production of knitted fabrics, a plurality of groups of yarn loop-manipulating implements, means for supporting said groups in parallel-plane relation to each other, and means moving generally lengthwise of said implements for severing yarn between said groups in said relation of the groups, said implements having means thereon for preventing withdrawal movement of a fabric thereon by the withdrawal movement of said severing means but providing for other withdrawal movement of the fabric from the implements.

4. In a device operative in the production of knitted fabrics, a plurality of groups of yarn loop-manipulating implements, means for supporting said groups in parallel-plane relation to each other, and means moving generally lengthwise of said implements for severing yarn between said groups in said relation of the groups, said implements having means thereon for bracing a fabric against the severing action of said severing means, preventing withdrawal movement of a fabric thereon by the withdrawal movement of said severing means, and providing for other withdrawal movement of the fabric from the implements.

5. A topping stand having point carrying sections adapted to be moved into either parallel or aligned positions, but members mounted to push loops lengthwise of the points and also to move between the points and out of the between position, and means for preventing the relative movement of said sections when said bit members are between the points.

6. A topping stand having point carrying sections adapted to be swung from a parallel to an aligned position, bit members mounted to push loops lengthwise of the points and also to move between the points and out of the between position, and means to prevent moving said bit members to the between position while said sections are in the parallel position.

7. A topping stand having point carrying sections adapted to be moved into either parallel or aligned positions, bit members mounted to push loops lengthwise of the points and also to move between the points and out of the between position, a means for supporting a transfer bar, said means mounted to swing forward of the stand and back, and means for pushing said bit members into the between position operated upon the forward movement of said bar supporting means.

8. A topping stand having point carrying sections adapted to be moved into either parallel or aligned positions, means for supporting a transfer bar arranged to swing forwardly and rearwardly of the stand, one of said sections having a mounting whereby it tends to hold its points rearwardly of those of another section, and means operated when said bar supporting means is swung forwardly to bring all the points to a uniform position for transferring purposes.

9. A topping stand having point carrying sections adapted to be moved into either parallel or aligned positions, a knife adapted to cut fabric held on said sections when they are in parallel position, means for supporting a transfer bar and mounted to swing forwardly and rearwardly of the stand, and means preventing the operation of said knife when said bar supporting means is in its forward position.

MAX RICHTER.